United States Patent [19]

Koschorek et al.

[11] Patent Number: 5,187,977
[45] Date of Patent: Feb. 23, 1993

[54] DEVICE FOR RECOGNITION OF DRIVING ON A GRADE

[75] Inventors: Ralf Koschorek, Hanover; Gerd Krüger, Seelze; Hartmut Rosendahl, Hanover; Johann Rothen, Sarstedt, all of Fed. Rep. of Germany

[73] Assignee: WABCO Westinghouse Fahrzeugbremsen GmbH, Hanover, Fed. Rep. of Germany

[21] Appl. No.: 676,892

[22] Filed: Mar. 28, 1991

[30] Foreign Application Priority Data

Mar. 29, 1990 [DE] Fed. Rep. of Germany ....... 4010073

[51] Int. Cl.⁵ .............................................. E01C 23/01
[52] U.S. Cl. ........................................ 73/146; 33/521
[58] Field of Search ................ 73/146, 105, 178 R; 33/521

[56] References Cited

U.S. PATENT DOCUMENTS

| 3,266,302 | 8/1966 | Spangler et al. | 73/146 |
| 4,422,322 | 12/1983 | Spangler | 73/146 |
| 4,473,319 | 9/1984 | Spangler | 73/146 |
| 4,741,207 | 5/1988 | Spangler | 73/146 |
| 5,065,618 | 11/1991 | Hodges, Sr. et al. | 73/146 |

FOREIGN PATENT DOCUMENTS

| 1901467 | 8/1969 | Fed. Rep. of Germany. |
| 2059340C3 | 5/1975 | Fed. Rep. of Germany. |
| 2435115C2 | 12/1983 | Fed. Rep. of Germany. |
| 3342535A1 | 5/1984 | Fed. Rep. of Germany. |
| 3302169A1 | 7/1984 | Fed. Rep. of Germany. |
| 3902491A1 | 8/1989 | Fed. Rep. of Germany. |

Primary Examiner—Donald O. Woodiel
Attorney, Agent, or Firm—Horst M. Kasper

[57] ABSTRACT

An apparatus for the recognition of a rising slope is provided in particular for commercial vehicles, such as trucks or busses. The device comprises at least one sensor (1) for the axle load of the rear axle and/or of the front axle, as well as a device (4) for measuring the vehicle acceleration relative to the road. The signals of the sensor (1) and of the device (4) are fed into an electronics (2). The electronics (2) recognizes from these fed-in data, whether the vehicle is disposed on an uphill grade or on a downhill grade or on level ground. The thus generated signal can be further employed in various electronic systems, for example, in an automatic drawbar force control system.

18 Claims, 2 Drawing Sheets

DEVICE FOR RECOGNITION OF DRIVING ON A GRADE

BACKGROUND OF THE INVENTION

1. Field of the Invention

The invention relates to a device for the recognition of driving a commercial vehicle having at least two axles on a grade as well as to a device for measuring vehicle acceleration.

2. Brief Description of the Background of the Invention Including Prior Art

A device for determination of slopes or inclined grade sections experienced by vehicles is known from the German Patent Document laid out DE-AS 3,334,719. A special grade slope sensor is not required according to the teachings of DE-AS 3,334,719 not required. However, various data are necessary for such a determination, where the data relate to the engine and to the vehicle specification such as, for example, field of characteristic curves for the engine, which are generally available only for few application cases.

A momentary evaluation of whether a vehicle, in particular a commercial vehicle such as a truck or a bus, is actually located on an upgrade slope or on a downgrade slope, is necessary as a criterion for various electronic subsystems in the vehicle, for example, for an automatic control of the drawbar force. In such an automatic drawbar force control, the brakes in the motor vehicle and in the trailer are automatically controlled such that the drawbar force does not exceed a certain value. This force control prevents a coasting and running up of the trailer.

A commercial vehicle control system can thus be improved without substantial additional costs and malfunctions can be prevented.

SUMMARY OF THE INVENTION

1. Purposes of the Invention

It is an object of the invention to provide a device which recognizes reliably and with simple means a uphill grade or a downhill grade for a vehicle.

It is another object of the present invention to automatically control the force exerted on drawbars of vehicle trailers.

It is a further object of the invention to generate and furnish an electronic signal which is objectively related to the slope angle of the road experienced by a running commercial vehicle.

These and other objects and advantages of the present invention will become evident from the description which follows.

2. Brief Description of the Invention

According to the present invention there is provided an apparatus for recognition of inclined grades during driving of a vehicle having a front and a rear axle, in particular for a commercial vehicle. An acceleration-measuring device is disposed at the vehicle. A sensor determines an axle load of one of the vehicle axles. An electronic control device is connected to the sensor and to the acceleration-measuring device. Signals of the sensor and of the acceleration-measuring device are fed to the electronic control device. Based on the fed-in signals, the electronic control device determines that an axle load transfer is caused by an uphill grade or by a downhill grade.

The electronic control device can compare the load, measured by the sensor and changed by the axle load transfer, with the load determined for a horizontal level.

The road grade can be calculated based on the difference of the axle loads on level ground and on a grade, by taking into account the vehicle acceleration and further data such as vehicle mass, position of center of gravity, drawbar force, coupling height level, and wheel base.

The sensor can operate as a distance path sensor. The respective axle load can be determined based on a spring compression of one of the axles. Signals corresponding to the measured load values and path distance values, respectively, can be filtered and averaged.

The electronic control device can determine the change in load-weight on the axles by subtracting instant values from values obtained in a standard horizontal position of the vehicle.

The electronic control device can determine the grade of the road
based on values of the axle load in a horizontal position of the vehicle and in an instant position of the vehicle,
based on the height distance of the center of gravity of the vehicle from a road surface,
based on the distance of the vehicle axes, and
based on a projection position of the center of gravity onto a contact plane formed by wheels and road surface.

The electronic control device can further receive values relating to a momentary acceleration of the vehicle and process values for properly correcting the value determined for the grade angle.

According to the present invention there is further provided a method for determining a sloping angle of a road passed by a vehicle comprising the following steps. The load for a first axle of a vehicle is sensed in a horizontal position. A load for a second axle of a vehicle is sensed in the horizontal position. The load for the first axle of a vehicle is sensed in a travelling position. The load for the second axle of a vehicle is sensed in the horizontal position. The received signals in an electronic circuit are processed for obtaining the sloping angle of the vehicle. The determined slope angle is corrected for any momentary acceleration experienced by the vehicle.

The device according to the invention employs the effect of the axle-load transfer upon driving on an uphill grade or on a downhill grade versus driving on level ground which effect had hitherto not been exploited for the determination and recognition of driving of the vehicle on a grade. Under horizontal road operating conditions, the center of gravity of a two axle vehicle is preferably disposed in the middle between the axles such that each axle will carry about the same load or an appropriate share of the load. If the center of gravity shifts between the axles, then the weight distribution of the load of the vehicle between, for example, the two axles is the inverse ratio of the corresponding distance of the vertical projection of the center of gravity and the respective wheel-road contact points. If the vehicle is on a slope, the vertical projection in the direction of the gravity field changes and thus the load ratio on the wheels changes versus the horizontal vehicle position. The higher the center of gravity and the closer the wheel axles, the faster the axle load ratio changes. No change of the load ratio would be observed if the height level of the center of gravity of the vehicle would coincide with a plane passing through the axles, which is impracticable in most cases. Thus, the axle load of the rear axle increases upon driving on an uphill grade slope, whereas the rear axle load decreases upon driving on a downhill grade. This effect is substantially dependent on the height level of the center of gravity based on the load of the vehicle relative to the level of the axles, the wheel base distance, and the relative distance of the center of gravity vertical projection onto a plane passing through the axles of the vehicle.

It is known that vehicle acceleration or vehicle deceleration results in similar effects of an axle load transfer. It is therefore advantageous to perform simultaneously a capturing and measuring of the vehicle acceleration and to consider the value of the vehicle acceleration either during the recognition of a drive on a grade, or to evaluate the axle load transfer only during a non-accelerated driving.

It is further possible, based on an advantageous embodiment of the invention, to calculate directly the road grade angle.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

DESCRIPTION OF INVENTION AND PREFERRED EMBODIMENT

In accordance with the present invention, an apparatus is provided for recognition of inclined grades during driving, in particular for commercial vehicles with at least two axles as well as with a device 4 for measuring the vehicle acceleration. A sensor 1 measures an axle load of a rear axle and a sensor 1' measures an axle load of a front axle, respectively, and the resulting signals are fed to an electronic control device 2. Acceleration signals derived from the device 4 are also fed to the electronic control device 2. The electronic control device 2 determines, based on the fed-in signals, if and to what extent an axle load transfer is caused by an uphill grade or by a downhill grade.

The electronic control device 2 can compare a changed axle load caused by an axle load transfer, with the axle load on level ground.

The road grade can be calculated based on the difference of the axle loads on level ground and on a grade, by taking into account the vehicle acceleration and further data such as vehicle mass, position of center of gravity, drawbar force, coupling height level, and wheel base. The sensor 1, 1' can serve as a distance path sensor. The respective rear axle load $F_{NHAE}$ in the plane actual or rear axle load $F_{NHA}$ can be determined based on a spring compression of the rear axle.

Figure 1:
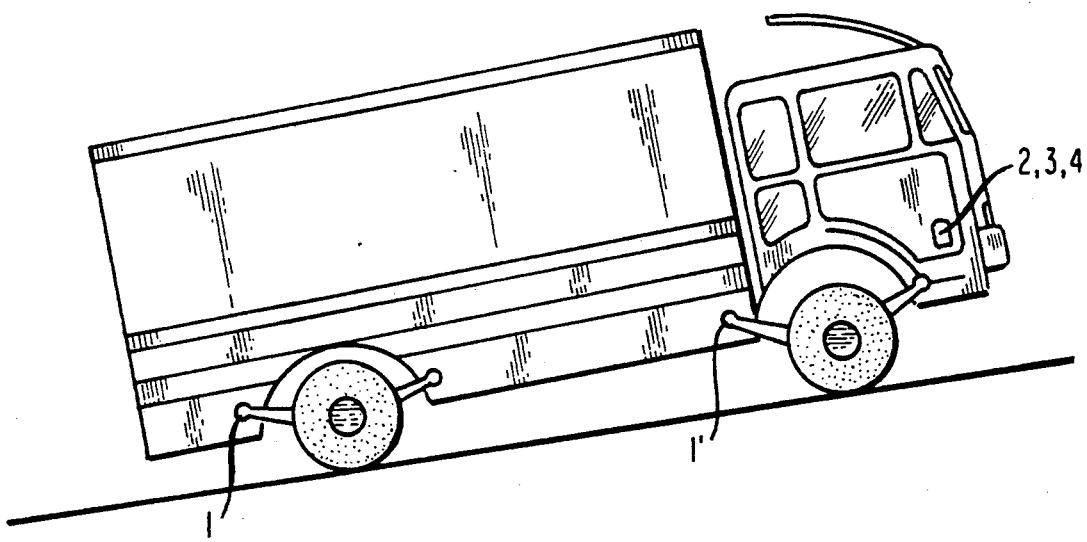
FIG. 1 illustrates a schematic side elevational view of a vehicle travelling on an uphill grade.

FIG. 1 illustrates schematically a vehicle during the driving on an uphill grade. One recognizes in FIG. 1 that the rear axle experiences a heavier load while driving on an uphill grade as compared to driving on a level ground, while the front axle is partially released and relieved from the load. This is illustrated in FIG. 1 in an exaggerated way for quick recognition. The heavier load or, respectively, the spring compression of the rear axle suspension is sensed by the load sensor 1. The load sensor 1, 1' is disposed at a suitable location, for example, at the loading points of the spring suspension. The load sensor 1, 1' can also sense the bending through and deflection of the rear axle. If the vehicle is air sprung, then the pressure in the spring bellows can be determined. The spring-suspension compression of the vehicle can be evaluated with a path sensor instead of employing a force sensor or, respectively, a load sensor.

Figure 2:
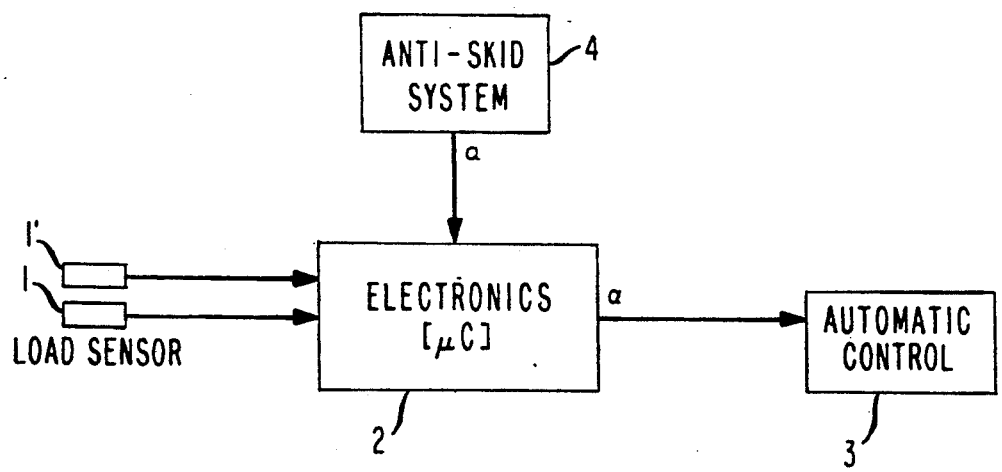
FIG. 2 is a view of a schematic block circuit diagram illustrating the electronic control circuitry.

According to FIG. 2, the initial value of the load sensor 1, 1' is fed to an electronics, including a microcomputer 2. In addition, the value of the vehicle acceleration or, respectively, deceleration a, derived from a device 4, is made available and fed into the electronics. This acceleration and/or deceleration value can, for example, be derived from an anti-skid system, where this acceleration and/or deceleration value is generally present as a signal. The anti-skid system determines the vehicle acceleration by evaluating the wheel speeds and thus, this determination is independent of the grade angle on which the vehicle is driven.

The anti-skid system comprises in addition at least one microcomputer. The functioning of such an anti-skid system is described for example, in the German Printed Patent Publication DE-A 2,844,279.

The microcomputer in the electronics 2 is programmed such, that it is capable of evaluating the formulas recited in the following. For example, a microcomputer of the company Texas Instruments, Dallas, Texas, model TMS 7742, can be employed.

The electronics 2 determines and derives from the input data, if an uphill grade or a downhill grade driving is present.

A case of an uphill grade is recognized for example, if the following equation holds:

$$|F_{NHA} - F_{NHAE}| > \Delta F_{NHA} \text{ and } |a_F| < |a_{Fmin}|,$$

wherein $a_{Fmin} \approx 0$

In this formula the variables have the following definitions:

$F_{NHAE}$ = value of the rear axle load on a level ground;
$F_{NHA}$ = actual value of the rear axle load;
$\Delta F_{NHA}$ = threshold difference between the actual value of the rear axle load and the rear-axle-load value on level ground, starting with which an uphill grade, is to be recognized;
$a_F$ = vehicle acceleration relative to the road;
$a_{Fmin}$ = threshold value of the vehicle delay, below which $a_F$ is assumed to be 0: $a_F = 0$.

The electronics 2 feeds the decision, whether an uphill or a downhill slope is present or also directly the value of the road grade $a$, to a further electronics for example, a drawbar automatic control 3, for further processing.

The rear axle load $F_{NHAE}$ measured on a horizontal road is advantageously determined such that, over certain time intervals and/or path distances, the actual value $F_{NHA}$, captured by the rear axle load sensor, is stored and all captured values are averaged by way of software based on a suitable conventional method. Such methods are known in the art.

Since the rear axle load varies based on the unevenness of the road surface, it is advantageous to employ a filtering of the output signal of the rear axle load sensor 1.

The capturing of the rear axle load on level ground $F_{NHAE}$ can be performed by storing the momentary value during driving on level ground based on a switch actuation by the driver.

According to a preferred embodiment of the invention, the precise grade slope angle $\alpha$ of the travelled road can be determined with the aid of approximately known data such as, for example, the wheel base, the position of the center of gravity, the vehicle mass, and the like.

Figure 3:
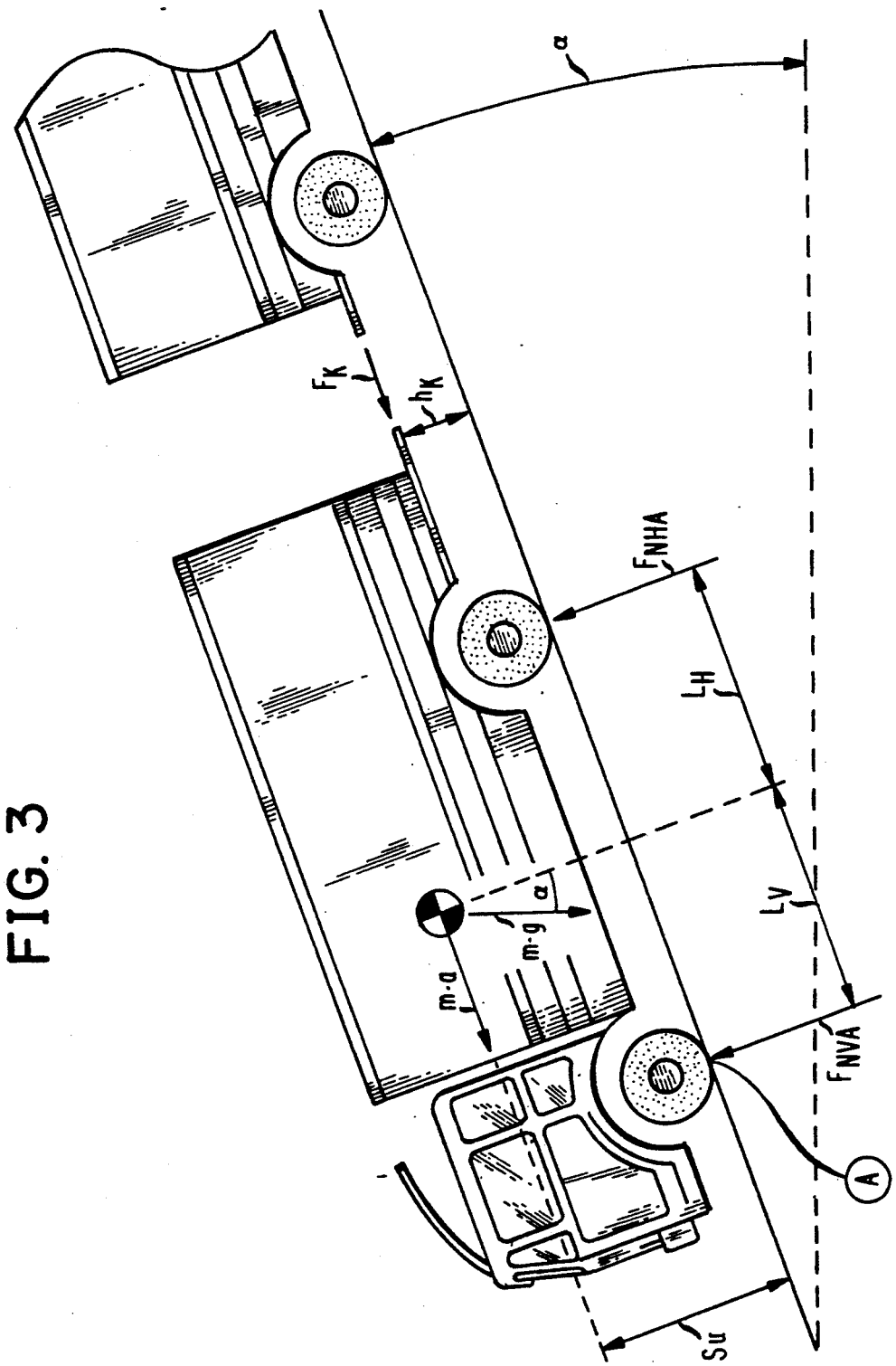
FIG. 3 shows a schematic side elevational view of a vehicle travelling on a downhill grade.

A downhill-driven vehicle train, as well as the forces acting on the train, is illustrated in FIG. 3, in which the variables have the following definitions:
$\Delta$ = road grade
m = vehicle mass
a = vehicle delay
= gravity acceleration
$h_S$ = height level of center of gravity of vehicle
$L_V$ = distance of the vehicle center of gravity from the front axle
$L_H$ = distance of the vehicle center of gravity from the rear axle
$F_K$ = coupling force or drawbar force
$h_K$ = height level of the trailer coupling
$F_{NHA}$ = rear axle load The forces $F_{NHA}$ and $F_K$ are to be employed in Newton = kgm/s$^2$.

If now, the sum of the torques is formed around point A, illustrated in FIG. 3, and defined as the contact point between road and periphery of a respective tire, there results the equation, $$\Sigma M^A = 0 = m.a.h_S - m.g.\cos\alpha.L_V + m.g.\sin\alpha.h_S + F_K.h_K + + F_{NHA}(L_V+L_H)$$

For small angles there results:

$$\cos\alpha \approx 1 \text{ and } \sin\alpha \approx \alpha$$

From this, there results:

$$0 = m.a.h_S - m.g.L_V + m.g.\alpha.h_S + F_K.h_K + F_{NHA}(L_V+L_H)$$

From this, the road slope angle $\alpha$ is determined to be:

$$\alpha = \frac{m \cdot g \cdot L_V - m \cdot a \cdot h_S - F_{NHA}(L_V+L_H) - F_K \cdot h_K}{m \cdot g \cdot h_S}$$

Parameters, which cannot be directly measured or determined and which are present in the equation for the road grade $\alpha$ such as, for example, the height level of the center of gravity of the vehicle $h_S$ as well as the remaining dimensions, can be input into the electronics 2 as approximated and estimated values. The vehicle mass m can be determined approximately via the load sensor 1. If the drawbar force $F_K$ is sensed, then this drawbar force $F_K$ is also known. However, the drawbar force $F_K$ could otherwise also be accepted with a constant value or could possibly also be disregarded. The thereby determined road grade $\alpha$ is sufficiently accurate for most application situations.

It will be understood that each of the elements described above, or two or more together, may also find a useful application in other types of devices for mountain-travel recognition differing from the types described above.

While the invention has been illustrated and described as embodied in the context of a device for mountain-travel recognition, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An apparatus for recognition of inclined grades during driving comprising
   a front axle disposed at a vehicle;
   a rear axle disposed at the vehicle, wherein the front axle and the rear axle form vehicle axles;
   a device disposed at the vehicle for measuring vehicle acceleration;
   a sensor for determining an axle load of one of the vehicle axles; and
   an electronic control device connected to the sensor and to the device for measuring the vehicle acceleration, wherein signals of the sensor and of the acceleration-measuring device are fed to the electronic control device, and wherein the electronic control device determines, based on the fed-in signals, that an axle load transfer is caused by an uphill grade or by a downhill grade.

2. The apparatus according to claim 1, wherein the vehicle is a commercial vehicle.

3. The apparatus according to claim 1, wherein the electronic control device compares the load, measured by the sensor and changed by the axle load transfer, with the load determined for a horizontal level position of the vehicle.

4. The apparatus according to claim 3, wherein the comparison is performed according to the formula, $$|F_{NHA} - F_{NHAE}| > \Delta F_{NHA} \text{ and } |a_F| < |a_{Fmin}|,$$

whereby $a_{Fmin} \approx 0$ wherein the variables in this formula have the following definitions:
$F_{NHAE}$ = value of the rear axle load on a level ground;
$F_{NHA}$ = actual value of the rear axle load;
$\Delta F_{NHA}$ = threshold difference between the actual value of the rear axle load and the rear-axle-load value on level ground, starting with which an uphill grade, is to be recognized;
$a_F$ = vehicle acceleration relative to the road;
$a_{Fmin}$ = threshold value of the vehicle delay, below which $a_F$ is assumed to be 0; $a_F$ = 0.

5. The apparatus according to claim 4, wherein the road grade angle is calculated based on the difference of the axle loads on level ground and on a grade, by taking into account the vehicle acceleration and further data such as vehicle mass, position of center of gravity, drawbar force, coupling height level, and wheel base, according to the formula:

$$a = \frac{m \cdot g \cdot L_V - m \cdot a \cdot h_S - F_{NHA}(L_V + L_H) - F_K \cdot h_K}{m \cdot g \cdot h_S}$$

wherein the parameters are defined as follows:
- $a$ = road slope;
- m = vehicle mass;
- g = gravity acceleration;
- $L_V$ = distance of the vehicle center of gravity from the front axle;
- a = vehicle delay;
- $h_S$ = height level of center of gravity of vehicle;
- $F_{NHA}$ = rear axle load;
- LH = distance of the vehicle center of gravity from the rear axle;
- $F_K$ = coupling force or draw-bar force;
- $h_K$ = height level of the trailer coupling.

6. The apparatus according to claim 5, wherein the sensor operates as a distance path sensor, and wherein the respective axle load ($F_{NVA}$ or $F_{NHA}$) is determined based on a spring-suspension compression of one of the axles.

7. The apparatus according to claim 1, wherein signals derived from the sensor and corresponding to the measured load values and path distance values, respectively, are filtered.

8. The apparatus according to claim 1, wherein signals derived from the sensor and corresponding to the measured load values and path distance values, respectively, are averaged.

9. The apparatus according to claim 1, wherein the electronic control device determines the change in load-on the axles by subtracting instant values from values obtained in a horizontal position of the vehicle.

10. The apparatus according to claim 1, wherein the electronic control device determines the grade of the road based on values of the axle load in a horizontal position of the vehicle and in an instant position of the vehicle, based on the height distance of the center of gravity of the vehicle from a road surface, based on the distance of the vehicle axes, and based on a projection position of the center of gravity onto a contact plane formed by wheels and road surface.

11. The apparatus according to claim 10, wherein the electronic control device further receives values relating to a momentary acceleration of the vehicle and processes values for properly correcting the value determined for the grade angle.

12. An apparatus for recognition of inclined grades during driving, in particular for commercial vehicles with at least two axles as well as with a device (4) for measuring the vehicle acceleration, comprising a sensor (1) for determining an axle load of a rear axle and of a front axle, respectively, and an electronic control device (2), wherein signals of the sensor (1) and of the device (4) are fed to the electronic control device (2), and wherein the electronic control device (2) determines, based on the fed-in signals, that an axle load transfer is caused by an uphill grade or by a downhill grade.

13. The apparatus according to claim 12, wherein the electronic control device (2) compares the load, changed by an axle load transfer, with the load on level ground.

14. The apparatus according to claim 13, wherein the comparison is performed according to the formula, $$|F_{NHA} - F_{NHAE}| > \Delta F_{NHA} \text{ and } |a_F| < |a_{Fmin}|,$$

whereby $a_{Fmin} \approx 0$ wherein the variables in this formula have the following definitions:
- $F_{NHAE}$ = value of the rear axle load on a level ground;
- $F_{NHA}$ = actual value of the rear axle load;
- $\Delta F_{NHA}$ = threshold difference between the actual value of the rear axle load and the rear-axle-load value on level ground, starting with which an uphill grade, is to be recognized;
- $a_F$ = vehicle acceleration relative to the road;
- $a_{Fmin}$ = threshold value of the vehicle delay, below which $a_F$ is assumed to be 0; $a_F = 0$.

15. The apparatus according to claim 14, wherein the road grade angle is calculated based on the difference of the axle loads on level ground and on a grade, by taking into account the vehicle acceleration and further data including vehicle mass, position of center of gravity, drawbar force, coupling height level, and wheel base, according to the formula:

$$a = \frac{m \cdot g \cdot L_V - m \cdot a \cdot h_S - F_{NHA}(L_V + L_H) - F_K \cdot h_K}{m \cdot g \cdot h_S}$$

wherein the parameters have the meaning:
- $a$ = road slope;
- m = vehicle mass;
- g = gravity acceleration;
- $L_V$ = distance of the vehicle center of gravity from the front axle;
- a = vehicle delay;
- $h_S$ = height level of center of gravity of vehicle;
- $F_{NHA}$ = rear axle load;
- LH = distance of the vehicle center of gravity from the rear axle;
- $F_K$ = coupling force or draw-bar force;
- $h_K$ = height level of the trailer coupling.

16. The apparatus according to claim 15, wherein the sensor (1) serves as a distance path sensor, wherein the respective axle load ($F_{NVA}$ or $F_{NHA}$) is determined based on a spring-suspension compression of at least one axle.

17. The apparatus according to claim 12, wherein signals coming from the sensor and corresponding to the measured load values and path distance values, respectively, are filtered.

18. The apparatus according to claim 12, wherein signals corresponding to the measured load values and path distance values, respectively, are averaged.

* * * * *